(12) United States Patent
Nakamura et al.

(10) Patent No.: US 7,607,023 B2
(45) Date of Patent: Oct. 20, 2009

(54) DATA TRANSFER METHOD, DATA TRANSFER APPARATUS, DATA TRANSMISSION DEVICE, AND DATA RECEPTION DEVICE

(75) Inventors: Takatoshi Nakamura, Yokkaichi (JP); Akihiro Yokota, Yokkaichi (JP)

(73) Assignee: NTI, Inc., Mie (JP)

( * ) Notice: Subject to any disclaimer, the term of this patent is extended or adjusted under 35 U.S.C. 154(b) by 655 days.

(21) Appl. No.: 10/475,828

(22) PCT Filed: Apr. 23, 2002

(86) PCT No.: PCT/JP02/04039

§ 371 (c)(1),
(2), (4) Date: Apr. 8, 2004

(87) PCT Pub. No.: WO02/089397

PCT Pub. Date: Nov. 7, 2002

(65) Prior Publication Data

US 2004/0162990 A1    Aug. 19, 2004

(30) Foreign Application Priority Data

Apr. 24, 2001  (JP) ............................. 2001-126459

(51) Int. Cl.
G06F 11/30  (2006.01)

(52) U.S. Cl. .................. 713/189; 713/164; 713/165

(58) Field of Classification Search ................ None
See application file for complete search history.

(56) References Cited

U.S. PATENT DOCUMENTS

| | | |
|---|---|---|
| 5,517,614 A | 5/1996 | Tajima |
| 5,778,071 A | 7/1998 | Caputo et al. |
| 6,263,437 B1 | 7/2001 | Liao et al. |
| 6,792,532 B1 * | 9/2004 | Lee et al. ..................... 713/171 |
| 7,110,545 B2 * | 9/2006 | Furuya et al. ............... 380/259 |
| 7,159,114 B1 * | 1/2007 | Zajkowski et al. .......... 713/171 |
| 2002/0126546 A1 | 9/2002 | Im et al. |
| 2004/0260950 A1 | 12/2004 | Ougi et al. |

FOREIGN PATENT DOCUMENTS

| | | |
|---|---|---|
| EP | 1 035 684 A2 | 9/2000 |
| JP | 1-253051 | 10/1989 |
| JP | 11-331148 | 11/1999 |
| WO | 98/24205 | 6/1998 |
| WO | 00/31917 | 6/2000 |

\* cited by examiner

*Primary Examiner*—Pramila Parthasarathy
(74) *Attorney, Agent, or Firm*—Merchant & Gould P.C.

(57) ABSTRACT

A data transfer method, a data transfer apparatus, a data sending apparatus, and a data receiving apparatus for encrypting and transferring data and in particular, a data transfer method, a data transfer apparatus, a data sending apparatus and a data receiving apparatus capable of transferring data in safety. In a data transfer method for transferring data from a sender to a receiver, a calculation algorithm for encrypting the data supplied from the sender to the receiver is encrypted at the receiver and transmitted from the receiver to a sender.

3 Claims, 13 Drawing Sheets

| Address | Data |
| --- | --- |
| A1 | D1 |
| A2 | D2 |
| A3 | D3 |
| ⋮ | ⋮ |
| An | Dn |

DATA TRANSFER METHOD, DATA TRANSFER APPARATUS, DATA TRANSMISSION DEVICE, AND DATA RECEPTION DEVICE

FIELD OF THE INVENTION

This invention relates to a method of data transfer, data transfer device, data transmission device, and data reception device; this invention also relates to a method of data encryption transfer, data transfer device, data transmission device, and data reception device.

DESCRIPTION OF THE PRIOR ART

As is known, the common method of personal authentication is to use magnetic card or IC card which stores the keyword. It need insert the magnetic card or IC card into a card reader to apply the method to personal authentication. The card reader reads out the keyword stored in magnetic card or IC card, then compares it with the prior login keyword or input keyword, and then end up the personal authentication if the two keywords are the same.

At this time, this known magnetic card or IC card corresponds to the keyword one to one with card reader's read-out.

Nevertheless, because this known magnetic card or IC card corresponds to the keyword in one-to-one relation with card reader's read-out, the read-out can be purely converted into ciphertext, and the keyword can be easily recovered by an analyzer, so it is not satisfactory in security. Therefore, the method of safely transferring data, data transfer device, data transmission device, and data reception device are widely expected.

SUMMARY OF THE INVENTION

This invention relates to a method of data transfer which transmits data from the transmission side to the reception side. It is an algorithm that the reception side encrypts the data received from the transmission side, and then transmits the encrypted data back to the transmission side.

Besides, in this invention, the algorithm which decrypts the encrypted algorithm is encrypted and transmitted from the reception side to the transmission side.

Furthermore, in this invention, the algorithm which encrypts the data is decrypted through executing multiple times of encryption and decryption repeatedly.

Besides, the algorithm varies with the data at a time.

Furthermore, divide the data into multiple bit-strings, and make the algorithm vary with different bit-strings.

In addition, this invention relates to a data transmission device which transmits data to the reception side, including: data encryption unit which encrypts the data transmitted to the reception side with prior set algorithm, and algorithm decryption unit which decrypts the encrypted algorithm transmitted from the reception side.

Furthermore, this invention relates to a data reception device which receives the data from the transmission side, including: data decryption unit which decrypts the data transmitted from the transmission side with prior set algorithm, and algorithm encryption unit which encrypts the algorithm of encrypting data.

According to this invention, not only can the data be encrypted, but the algorithm of encrypting data can be encrypted; therefore, data security is improved.

PREFERABLE IMPLEMENTATION EXAMPLE OF THIS INVENTION

Figure 1:
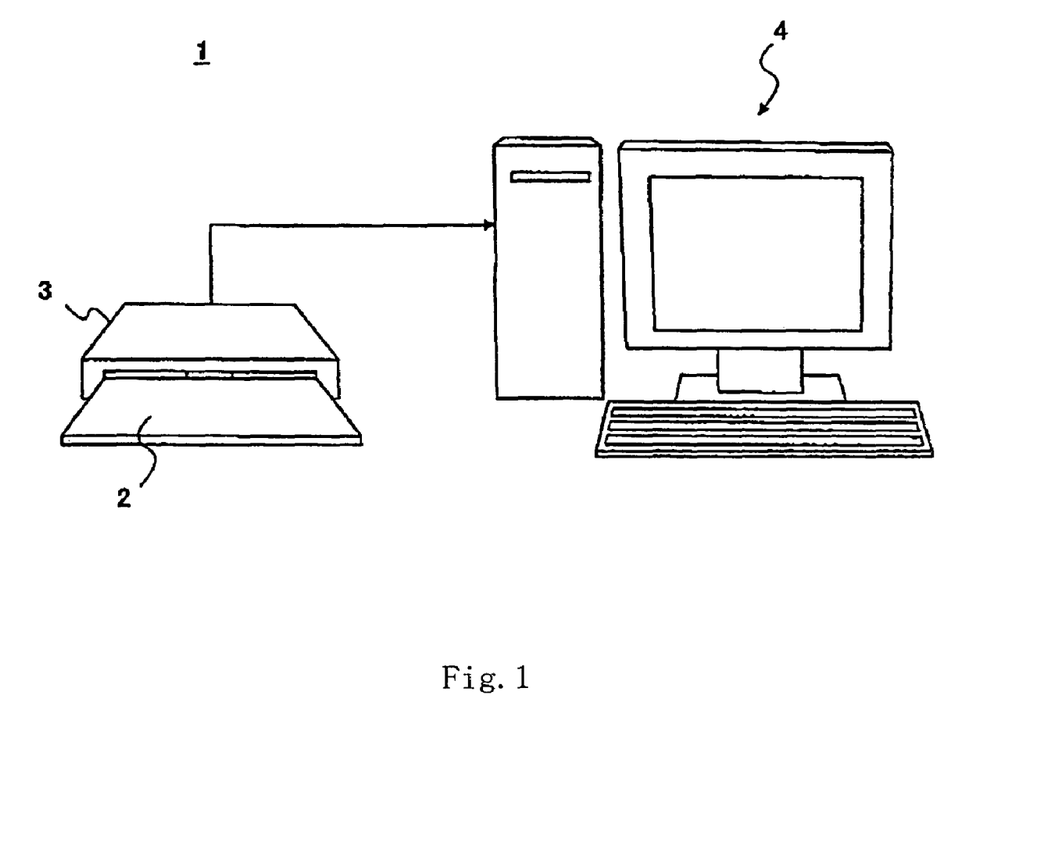
FIG. 1 is the system structure of implementation example 1 of this invention.

FIG. 1 is the system structure of implementation example 1 of this invention.

System 1 of this implementation example consists of IC card 2, IC card reader 3 and processing device 4.

IC card 2 stores information of authentication number, etc. in advance. IC card reader 3 is to read out information stored in IC card 2. The read-out of IC card reader 3 is fed to processing unit 4, and authentication is executed with the read-out. Besides, processing unit 4, according to authentication result of IC card reader 3, executes control by means of processing with authentication passing and no processing with authentication no passing.

At this time, when the information of IC card 2 is being read by IC card reader 3 in implementation example 1, it can co-operate between IC card 2 and processing device 4 to operate in the form of dynamic cipher conversion.

Figure 2:
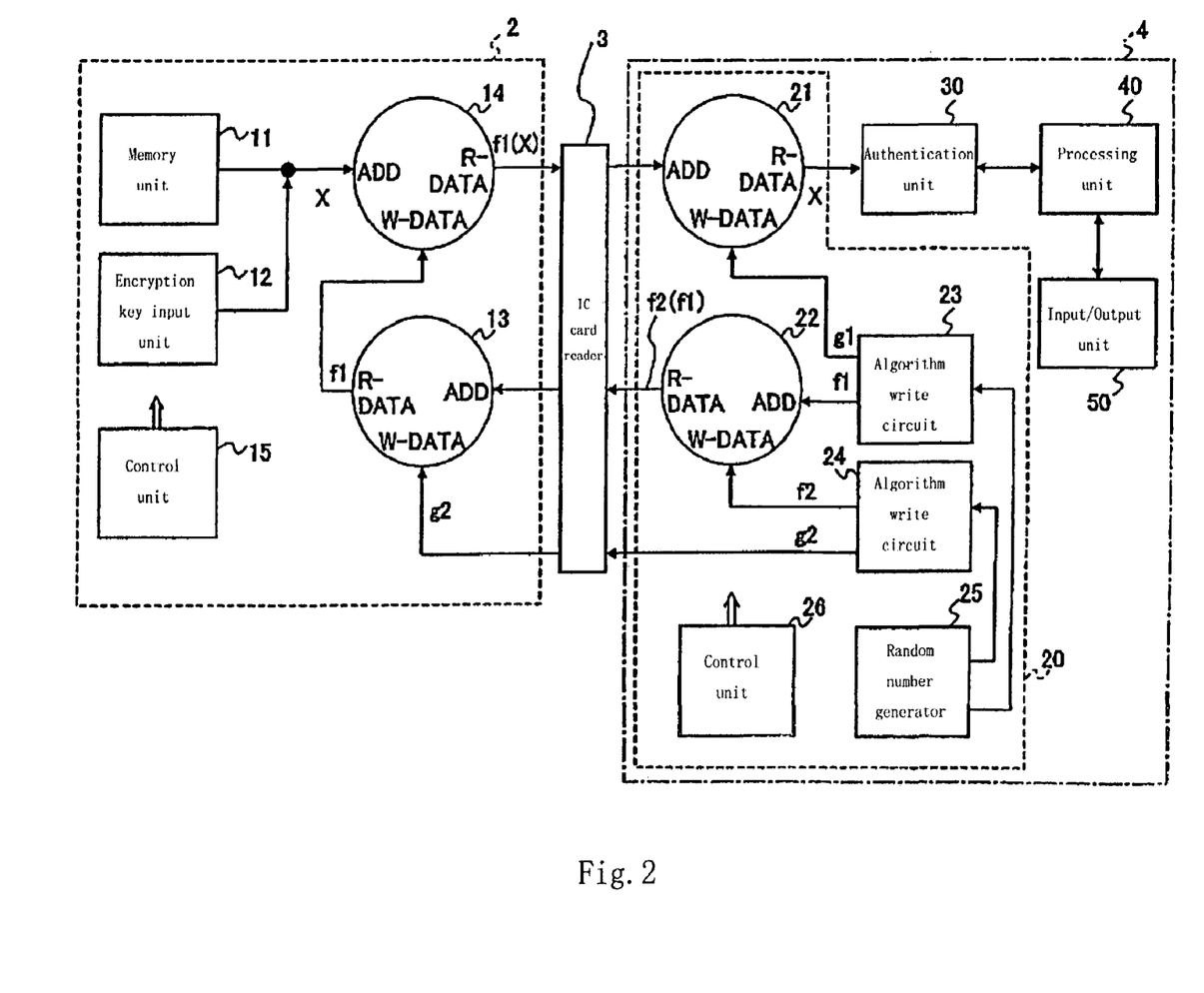
FIG. 2 is the block diagram of critical part of an implementation example of this invention.

FIG. 2 is the block diagram of critical part of an implementation example of this invention.

IC card 2 consists of memory unit 11, ciphertext input unit 12, and variable arithmetic circuits 13 and 14. Memory unit 11 and ciphertext input unit 12 are composed of ROM. Identification number ID is stored in memory unit 11 in advance. Ciphertext is stored in ciphertext input unit 12 in advance. In addition, fingerprint input unit can also be used as encryption key input unit 12.

Variable arithmetic circuits 13 and 14 consist of RAM with address, data read and data write port 3.

Variable arithmetic circuit. 13 connects address port and data write port with IC card reader 3, and connects data read port with data write port of variable arithmetic circuit 14. That is, variable arithmetic circuit 13 programs the arithmetic result of set algorithm of IC card reader 3, inputs it as IC card reader 3 input, and then feeds the arithmetic result corresponding to input to variable arithmetic circuit 14.

Variable arithmetic circuit 14 connects address port with memory unit 11 and ciphertext input unit 12, connects data write port with data read port of variable arithmetic circuit 13, and makes data request port as output of IC card 2. That is, variable arithmetic circuit 14 programs the arithmetic result of algorithm of variable arithmetic circuit 13, inputs ID in memory unit 11 or inputs ciphertext through ciphertext input unit 12, and then feeds the programmed arithmetic result corresponding to input to IC card reader 3.

IC card reader 3 has a junction point with IC card 2 and may exchange information with IC card 2 as soon as IC card 2 is inserted. In addition, IC card reader 3 connects with processing device 4 through interface, so being the interface of IC card 2 and processing device 4.

Processing unit 4 consists of interface port 20, authentication unit 30, processing unit 40 and input/output unit 50.

Interface port 20 consists of variable arithmetic circuits 21 and 22, algorithm write circuits 23 and 24, random number generator 25 and control circuit 26.

Variable arithmetic circuit 21 feeds address port with the arithmetic result of variable arithmetic circuit 14 of IC card 2, feeds data write port with the arithmetic result of algorithm of algorithm write circuit 23, and feeds authentication unit 30 with the arithmetic result from data read port. Variable arithmetic circuit inputs the arithmetic result of the set algorithm f of algorithm write circuit 22, and outputs to authentication unit 30 the arithmetic result corresponding to the output of variable arithmetic circuit 14 of IC card 2.

Variable arithmetic circuit 22 feeds address port with the input of the set algorithm f of algorithm write circuit 23, feeds data write port with the arithmetic result of set algorithm g of algorithm write circuit 24, and feeds address port of variable arithmetic circuit 13 of IC card 2 with the arithmetic result from data read port. Variable arithmetic circuit 22 inputs the arithmetic result of the set algorithm g of algorithm write circuit 24, and outputs to IC card 2 the arithmetic result of algorithm f of algorithm write circuit 23.

Here, explain variable arithmetic circuits 13, 14, 21 and 22 in detail.

Figure 3:
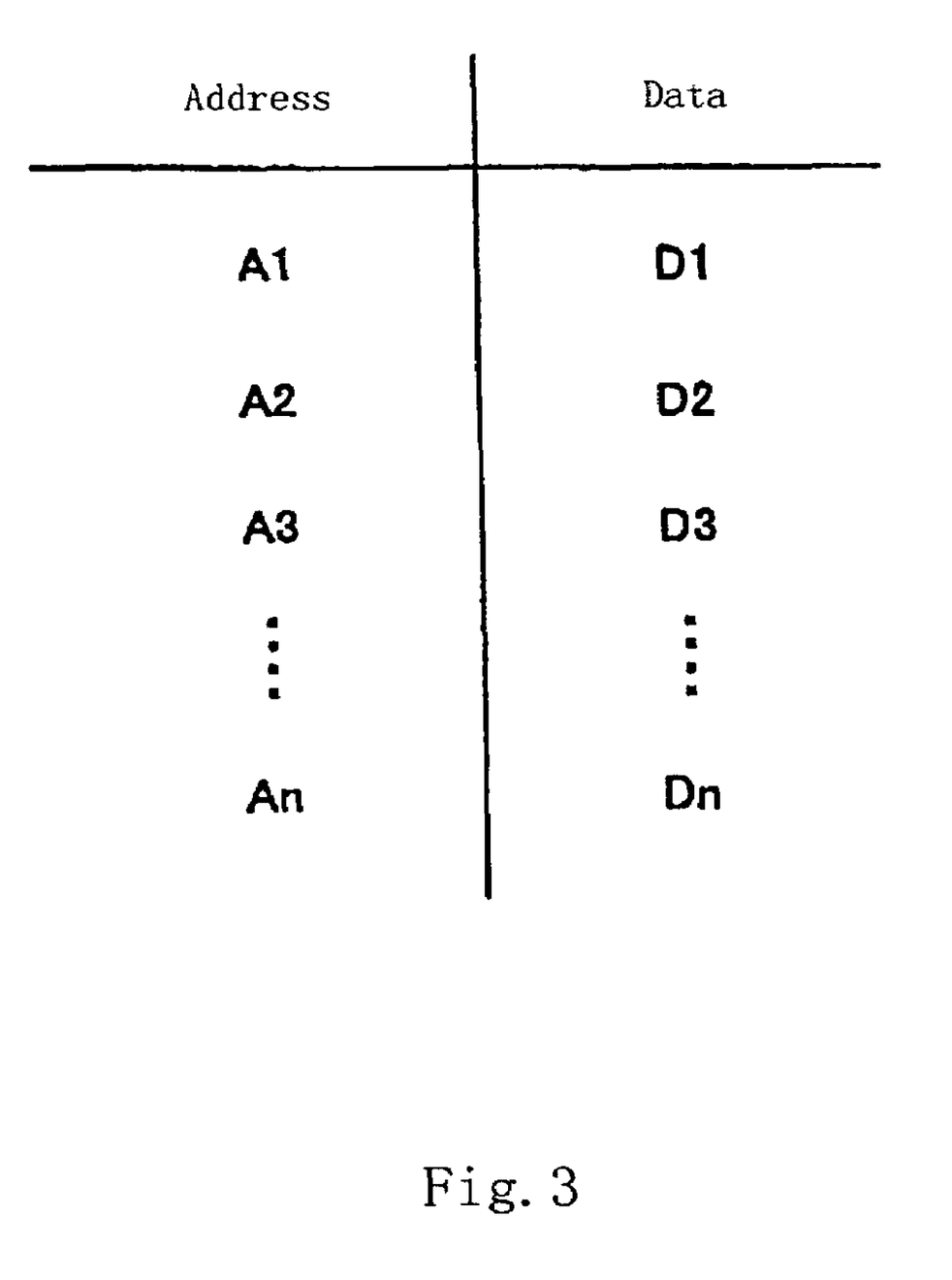
FIG. 3 is variable arithmetic circuit structure of an implementation example of this invention.

FIG. 3 is variable arithmetic circuit structure of an implementation example of this invention.

Variable arithmetic circuits 13, 14, 21 and 22 have the same structure as common semiconductor mnemonic, storing data D1-Dn according to address A1-An. Variable arithmetic circuits 13, 14, 21 and 22 store the arithmetic results of the set algorithm with the set algorithm input as address.

Here, come back to FIG. 2 to explain.

Algorithm write circuit 23 generates the arithmetic result of algorithm g1 for decrypting algorithm f1, and writes it into variable arithmetic circuit 21; meanwhile, outputs algorithm f1 as address of variable arithmetic circuit 22. Besides, algorithm write circuit 24 generates algorithm f2 which is the arithmetic result, and writes it into variable arithmetic circuit 22; meanwhile, writes algorithm g2 for decrypting algorithm f2 into variable arithmetic circuit 13.

At this time, algorithm write circuits 23 and 24 are fed with random numbers generated by random number generator 25, and determine algorithms f2 and g1 according to the random numbers, and then determine algorithms f1 and g1 according to f2 and g1. Therefore, algorithm write circuits 23 and 24 can enact different algorithms to be variable arithmetic circuits 13, 14, 21 and 22. Authentication unit 30 outputs authentication result according to the arithmetic result of variable arithmetic circuit 21.

Next, explain the actions of transmitting ID and ciphertext of IC card 2 to IC card reader 3.

On being inserted into IC card reader 3, IC card 2 is checked by control unit 27 of IC card reader 3 whether has been inserted well. Control unit 27 will control random number generator 25 to generate random number after it determines that IC card 2 has been inserted well. The random number generated by random number generator 25 is fed to algorithm write circuit 24. Algorithm write circuit 24 then outputs the arithmetic result f2 corresponding to the random number. In addition, arithmetic result f2 itself can be the random number.

Arithmetic result f2 of algorithm write circuit 24 is written into variable arithmetic circuit 22. Besides, algorithm write circuit 24 generates and outputs the arithmetic result g2 for decrypting arithmetic result f2. Arithmetic result f2 of algorithm write circuit 24 is written into variable arithmetic circuit 13 through card reader 3.

On the other hand, algorithm write circuit 23 generates the arithmetic result which is corresponding to the random number and is wrote into variable arithmetic circuit 21. Besides, algorithm write circuit 23, at this time, generates the arithmetic result of decrypting arithmetic result g1, and outputs it as address of variable arithmetic circuit 22.

Variable arithmetic circuit 22 outputs the arithmetic result f2 corresponding to arithmetic result f1 of algorithm write circuit 23. If the output of variable arithmetic circuit 22 is expressed by function, it can be expressed by F2(F1) when function of arithmetic result f2 is F2 and function of arithmetic result f1 is F1.

The output of variable arithmetic circuit 22 is fed to address port of variable arithmetic circuit 13 through IC card reader 3. Variable arithmetic circuit 13 outputs stored arithmetic result g2 corresponding to the output of variable arithmetic circuit 22 through algorithm write circuit 24. That is, variable arithmetic circuit 22 decrypts the encrypted function F1 by function F2 back to function F1.

Arithmetic result f1 decrypted by variable arithmetic circuit 22 is wrote into variable arithmetic circuit 14; store address is corresponding to the input equal to the arithmetic result f1 of function F1.

As soon as function F1 is stored in variable arithmetic circuit 14, ID of memory unit 11 will be fed to address port of variable arithmetic circuit 14.

Variable arithmetic circuit 14 outputs the arithmetic result f1 of function F1 with ID and ciphertext as input. The output of variable arithmetic circuit 14 is fed to address port of variable arithmetic circuit 21 through IC card reader 3. In variable arithmetic circuit 21 is stored the address corresponding to the input equal to arithmetic result g1 of function C1 of algorithm write circuit 23. Function G1 is to recover the input x of function P1, ID of memory unit 11 and encryption key of encryption key input unit 12.

ID and ciphertext recovered by variable arithmetic circuit 21 are fed to authentication unit 30. Authentication unit 30 checks whether the arithmetic result x of variable arithmetic circuit 21 is the prior login ID and encryption key, and authentication will be executed if x is just the ID and encryption key. Authentication unit 30 feeds the authentication result to processing unit 40. Processing unit 40 executes by itself the input/output of input/output unit 50 after ID and encryption key of IC card 2 have been authenticated by authentication unit 30.

In addition, each part of interface port 20 is controlled by control circuit 26.

At this time, according to this implementation example, cipher conversion and transmission can be executed to function inconstant at a time of processing device 4 with the help of variable arithmetic circuits 13, 14, 21 and 22 feeding ID and ciphertext of IC card 2 to processing device 4. Besides, cipher conversion and transmission can be executed to inconstant function transmitted from processing device 4 to IC card 2 as function inconstant at a time.

Therefore, ID and ciphertext of IC card 2 which is read out by IC card reader 3 can not be interpreted even if when they are being read out because the information has been encrypted. Besides, because encryption is executed by function inconstant at a time which is determined by random number, ciphertext can not be easily interpreted. In addition, even if the ciphertext has been interpreted, the interpreted information makes no sense because next authentication will use different encryption function.

Besides, when ID or ciphertext of IC card 2 is being transmitted, the whole data string may not be encrypted with the same algorithm; the whole data string can be divided into multiple parts and each part is encrypted with different algorithm.

Figure 4:
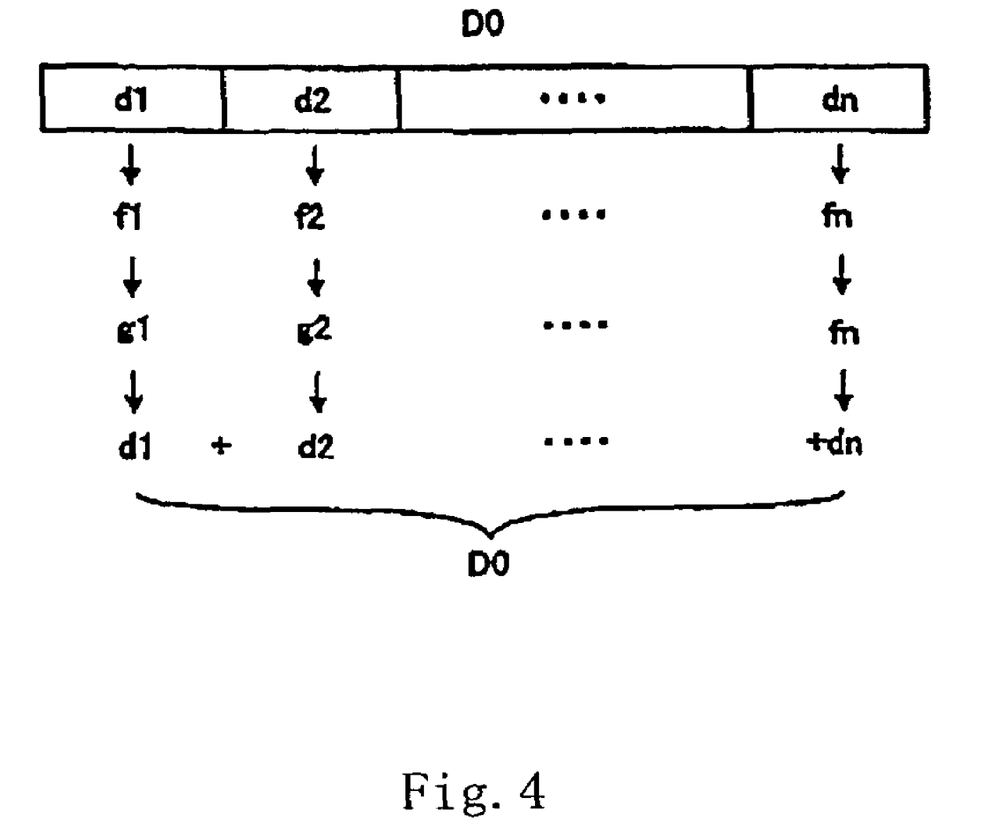
FIG. 4 is the action explanatory diagram of the modified example of implementation example 1 of this invention.

FIG. 4 is the action explanatory diagram of the modified example of implementation example 1 of this invention.

Divide the data string into multiple data segments d1-dn as FIG. 4 shows, encrypt data segment d1 with algorithm f1 and transmit the encrypted f1(d1), and then decrypt f1(d1) with algorithm g1 to original data segment d1 at the reception side; encrypt data segment d2 with algorithm f2 and transmit the encrypted f2(d2), and then decrypt f2(d2) with algorithm g2 to original data segment d2 at the reception side. Likewise, encrypt data segment dn with algorithm fn and transmit the encrypted fn(dn), and then decrypt fn(dn) with algorithm gn to original data segment dn at the reception side.

It can be simply realized in this implementation example because algorithms f1-fn and g1~gn can be easily wrote. Therefore, to transmit data string makes it difficult to execute cipher conversion.

In addition, in this implementation example, it is not a limitation to this invention that variable arithmetic circuit consists of two segments; it may also consist of multiple segments.

Figure 5:
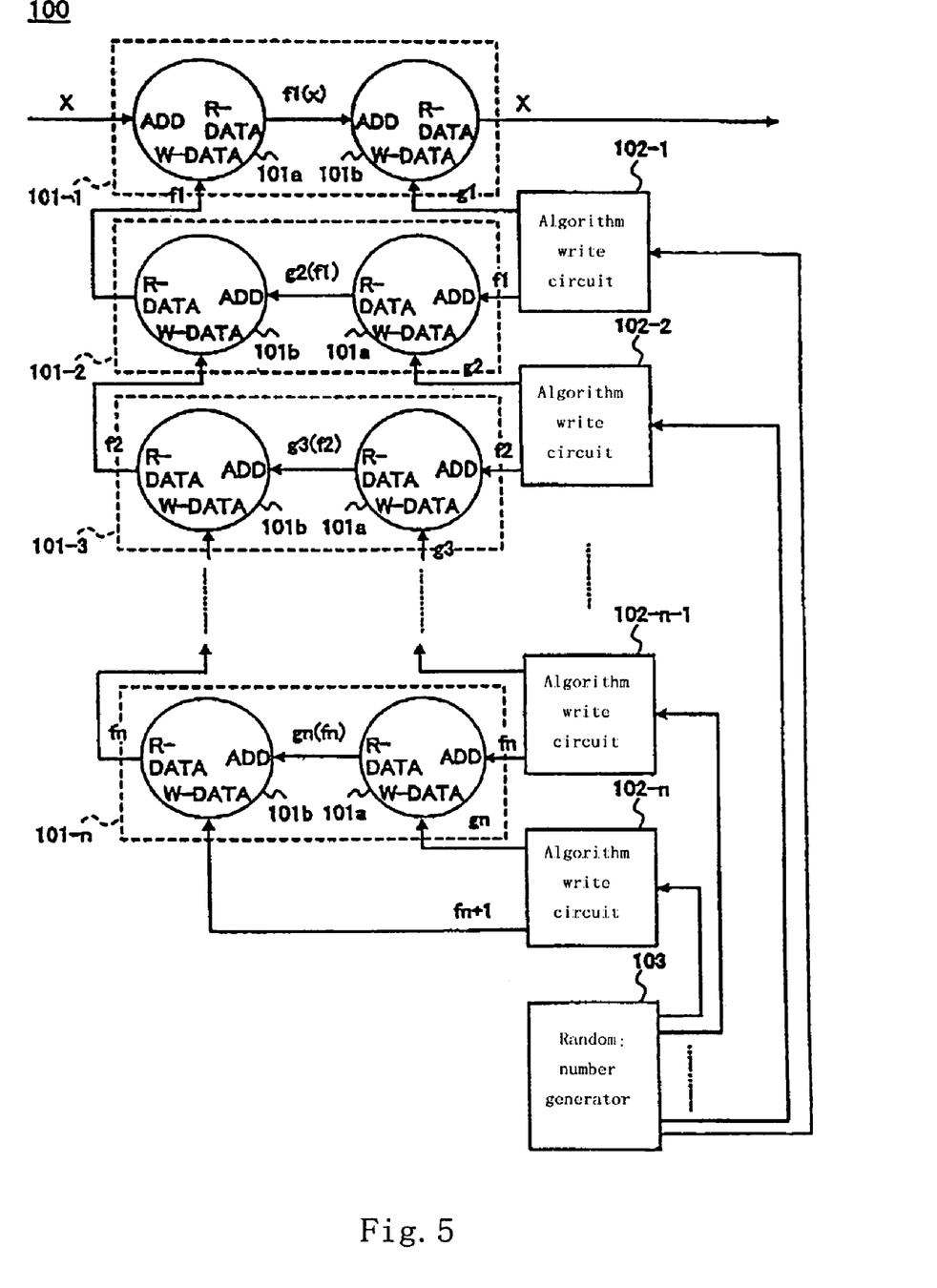
FIG. 5 is the block diagram of critical part of implementation example 2 of this invention.

FIG. 5 is the block diagram of critical part of implementation example 2 of this invention. FIG. 4 includes only data transfer part, leaving out explanations of peripheral circuits.

This implementation example is a system which stipulates variable arithmetic circuit to consist of n segments to improve privacy.

Transfer system 100 of this implementation example consists of encryption circuits 101-1~101-n, algorithm write circuits 102-1~102-n and random number generator 103.

Encryption circuits 101-1 encrypts the data x transmitted from the transmission side to the reception side. Besides, encryption circuits 101-2~101-n encrypt the data transmitted from the reception side to the transmission side. Algorithm write circuits 102-1~102-n determine the encryption algorithms applied to encryption circuits 101-1~101-n.

Encryption circuits 101-1~101-n consist of respective encryption circuit 101a and decryption circuit 101b. Encryption circuit 101a is composed of mnemonic which data may be repeatedly wrote into, and stores encryption algorithm set by algorithm write circuits 102-1~102-n. Decryption circuit 101b is composed of mnemonic which data may be repeatedly wrote into, and stores decryption algorithm set by algorithm write circuits 102-1~102-n. In encryption circuit 101a and decryption circuit 101b, algorithm input are set to be address, and arithmetic results are stored.

Algorithm write circuits 102-1~102-n output the encryption algorithm and decryption algorithm in pairs. At this time, algorithm write circuit 102-1 writes the decryption algorithm into decryption circuit 101b of encryption circuit 101-1, and then writes the encryption algorithm into encryption circuit 101a of encryption circuit 101-1 through encryption circuits 101-2.

Besides, algorithm write circuits 102-2~102-(n–1) writes the encryption algorithm of algorithm write circuit 102-i into encryption circuit 101a of encryption circuit 101-i, and then writes the decryption algorithm into decryption circuit 101b of encryption circuit 101-i through encryption circuit 101-(i+1). Algorithm write circuit 102-n writes the encryption algorithm into encryption circuit 101a of encryption circuit 101-n, and then writes the decryption algorithm into decryption circuit 101b of encryption circuit 101-n.

Besides, random number generator 103 feeds random number to algorithm write circuits 102-1~102-n. Algorithm write circuits 102-1~102-n generate algorithms according to the random numbers generated by random number generator 103. Besides, the random number of random number generator 103 can be directly used as ciphertext.

According to this implementation example, not only can the data transmitted from the transmission side to the reception side be encrypted, but the encryption algorithm can be encrypted to transmit from the reception side to the transmission side. Furthermore, because the encryption algorithm is to be divided into n segments to be encrypted respectively, the decryption is very difficult.

In addition, encryption is executed with encryption circuits in n-segment series in this implementation example, yet it is also feasible to make a segment's output as next input of the segment for n times to act as encryption circuit.

Figure 6:
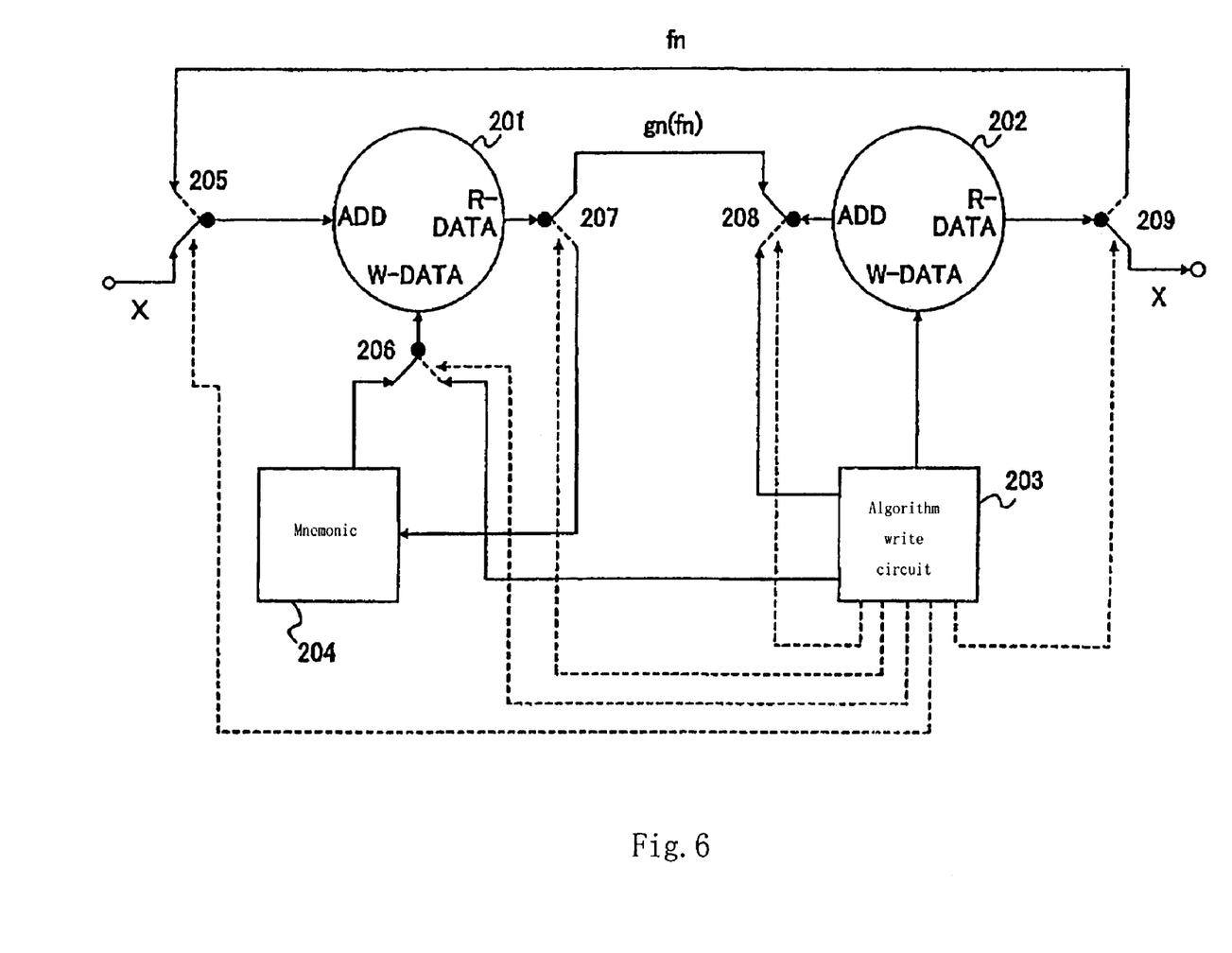
FIG. 6 is the block diagram of critical part of implementation example 3 of this invention.

FIG. 6 is the block diagram of critical part of implementation example 3 of this invention.

System 200 of this implementation example consists of variable arithmetic circuits 201 and 202, algorithm write circuit 203, mnemonic 203 and path switches 205~209.

Variable arithmetic circuits 201 and 202 which consist of mnemonic which data may be repeatedly wrote into, are to write algorithm generated by algorithm write circuits 203.

Mnemonic 204 stores the output of variable arithmetic circuit 201. Path switches 205~209 execute path shifting.

When data x is transmitted from the transmission side to the reception side, firstly, shift path switches 205~209 in dotted line path through algorithm write circuit 203. Secondly, write the decryption algorithm by variable arithmetic circuit 201 through path switch 206 when write the encryption algorithm by variable arithmetic circuit 202 through algorithm write circuit 203. In variable arithmetic circuits 201 and 202, algorithm input are as address and the above arithmetic results are wrote at the address corresponding to the input.

Algorithm write circuit 203 writes the algorithms corresponding to variable arithmetic circuit 201 and 202, then algorithm write circuit 203 feeds the encrypted address by variable arithmetic circuit 201 through path switch 208. Encryption is executed by variable arithmetic circuit 202, and then is fed to variable arithmetic circuit 202 through path switches 209 and 205.

Variable arithmetic circuit 202 decrypts the data transmitted from variable arithmetic circuit 202. Decrypted data are fed to mnemonic 204 through path switch 207, and are stored in mnemonic 204.

Next, write into variable arithmetic circuit 202 the algorithm of decrypting the encrypted data transmitted from algorithm write circuit 203 to mnemonic 204. Besides, shift path switches 205~209 in full line path, and write the encrypted data stored in mnemonic 204 into variable arithmetic circuit 201.

Next, feed data x which are to be transmitted to variable arithmetic circuit 201 address. Data x are encrypted by variable arithmetic circuit 201, and then are fed to variable arithmetic circuit 202 through path switches 207 and 208. Variable arithmetic circuit 202 decrypts the encrypted data by variable arithmetic circuit 201 to data x transmitted from the transmission side. Decrypted data by variable arithmetic circuit 201 are exported through path switch 209.

In addition, data x are just transmitted after one encryption in this implementation example, yet it is also feasible to transmit data x after n times of encryption with output as next input, which may execute in-depth encryption.

In addition, in the above implementation examples, IC card authentication system is explained to adapt to this invention, yet this authentication system is not confined to this invention; it also adapts to file read/out between user terminal and servo.

Figure 7:
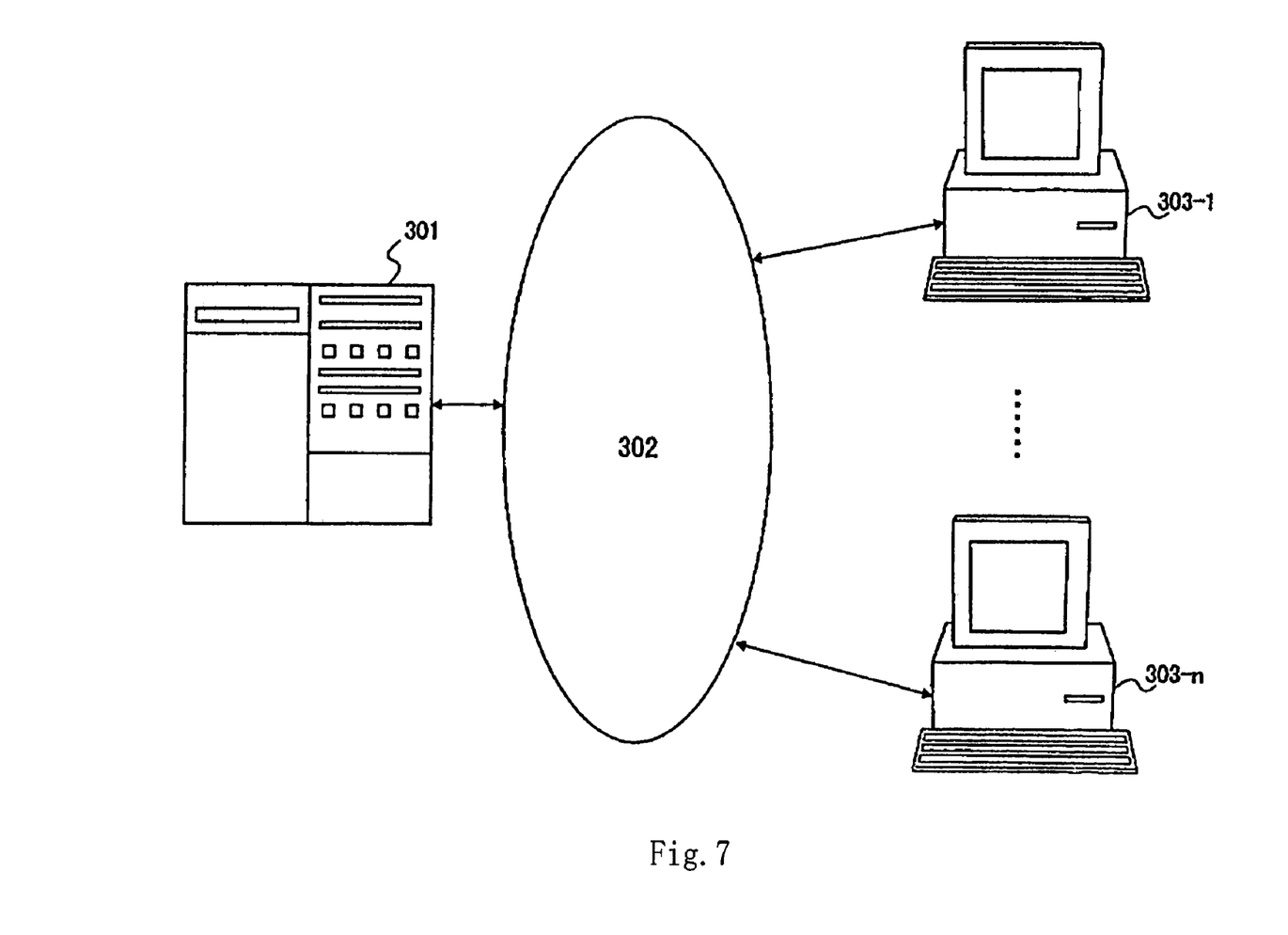
FIG. 7 is the system structure of implementation example 3 of this invention.

FIG. 7 is the system structure of implementation example 3 of this invention.

System 300 of this implementation example consists of servo 301, network 302 and user terminals 303-1~303-n.

Servo 301 connects with user terminals 303-1~303-n through network 302. Files are transferred between servo 301 and user terminals 303-1~303-n through network 302.

Next, explain servo 301 in detail.

Figure 8:
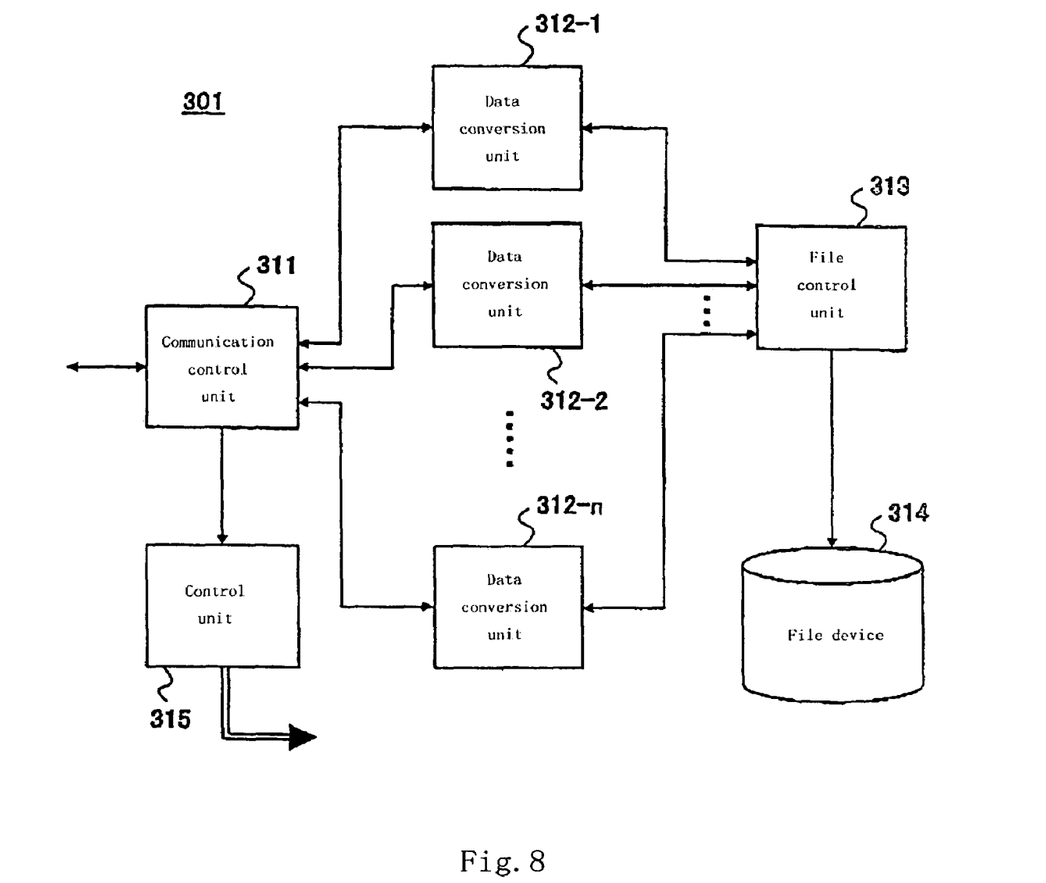
FIG. 8 is the block diagram of servo of implementation example 3 of this invention.

FIG. 8 is the block diagram of servo of implementation example 3 of this invention.

Servo 301 consists of communication control unit 311, data conversion units 312-1~312-n, file control unit 313, file device 314 and control unit 315. Communication control unit 311 controls the communication with network 302. Data conversion units 312-1~312-n are installed corresponding to user terminals 303-1~303-n, and execute data conversion as explained below.

File control unit 313 controls file device 314, and executes file read/write. File device 314 stores files of user terminals 303-1~303-n.

Next, explain data conversion units 312-1~312-n in detail.

Figure 9:
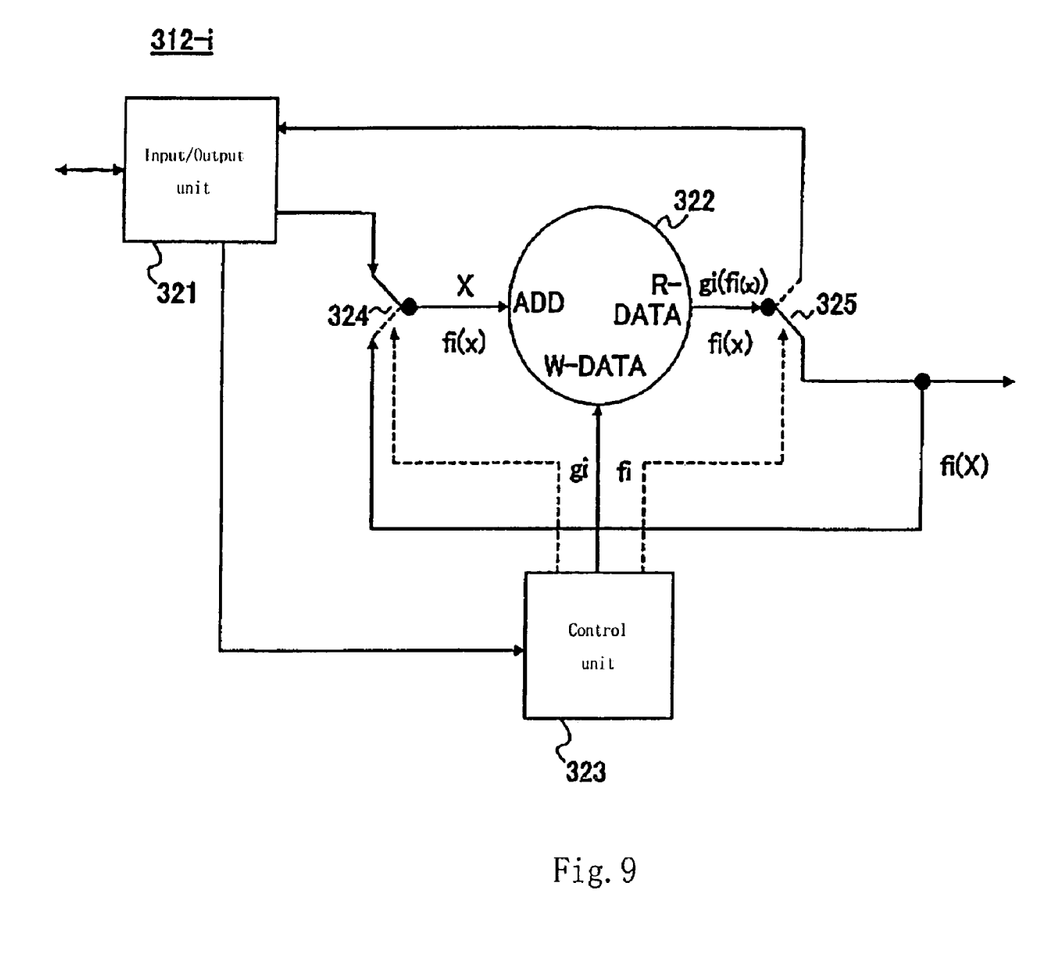
FIG. 9 is the block diagram of data conversion unit of implementation example 3 of this invention.

FIG. 9 is the block diagram of data conversion unit of implementation example 3 of this invention.

Data conversion units 312-1~312-n are installed corresponding to user terminals 303-1~303-n, and read out data from respective user terminal.

Among data conversion units 312-1~312-n, data conversion unit 312-i consists of input/output unit 321, variable arithmetic circuit 322, control unit 323 and path switches 324 and 325.

Input/output unit 321 controls file input/output of user terminal 303-i. Variable arithmetic circuit 322 executes encryption or decryption according to the algorithm wrote by control unit 323. Variable arithmetic circuit 322 is composed of read-write mnemonic, with algorithm input as address, and stores the arithmetic result.

Control unit 323 controls the algorithm wrote into variable arithmetic circuit 322. Path switches 324 and 325 are controlled by control unit 323 and execute path shifting when files are being wrote/read.

Next, explain the actions of data conversion unit 312-i.

To begin with, explain the files wrote into file device 314.

When file is wrote into file device 314, path switches 324 and 325 shift in the full line path. Next, information which determines the algorithm of user terminal 303-i is fed to control unit 323. The above information can also be the identification number of user terminal 303-i.

Control unit 323 generates algorithm gi corresponding to information of user terminal 303-i. Algorithm fi generated by control unit 323 is wrote into variable arithmetic circuit 322.

On being wrote into variable arithmetic circuit 322, algorithm fi feeds file of user terminal 303-i to variable arithmetic circuit 322 through path switch 324. Variable arithmetic circuit 322 encrypts file with algorithm fi, and then feeds to file device 314 through path switch 325. As explained above, file x of user terminal 303-i is encrypted to fi(x) to store in file device 314.

When file device 314 reads file x to user terminal 303-i, path switches 324 and 325 shift in the dotted line path. Next, control unit 323 determines the algorithm gi of decrypting algorithm fi. Control unit 323 manages the algorithm f1 of writing files into user terminals 303-1~303-n, and reads out respective algorithm fi as requested by user terminals 303-1~303-n. For example, control unit 323 reads out algorithm fi according to ciphertext input of user terminal 303-i.

Control unit 323 generates algorithm gi which decrypts original file from algorithm fi according to algorithm fi. Algorithm generated by control unit 323 is wrote into variable arithmetic circuit 322.

On being wrote into variable arithmetic circuit 322, algorithm gi feeds file fi(x) of file device 314 to variable arithmetic circuit 322 through path switch 324. Variable arithmetic circuit 322 decrypts file with algorithm gi, and then feeds to input/output unit 321 through path switch 325. As explained above, file fi(x) of file device 314 is decrypted to x to transmit to user terminal 303-i.

In addition, data conversion 312-i may be as interface port.

According to this implementation example, files are encrypted to store, so others can not refer to personal file. In addition, because the actions of data conversion 312-I are irrelevant to user terminal 303-i and independent, operation is nice.

Besides, it is easily realized at servo side to install data conversion 312-i only between communication control unit 311 and file device 314. Furthermore, data conversion 312-i can be constructed by hardware to operate at high speed. In addition, data conversion can be executed only by mnemonic, which may realize simple structure.

In addition, cipher conversion data, cipher conversion table and ciphertext can be used to encrypt.

Figure 10:
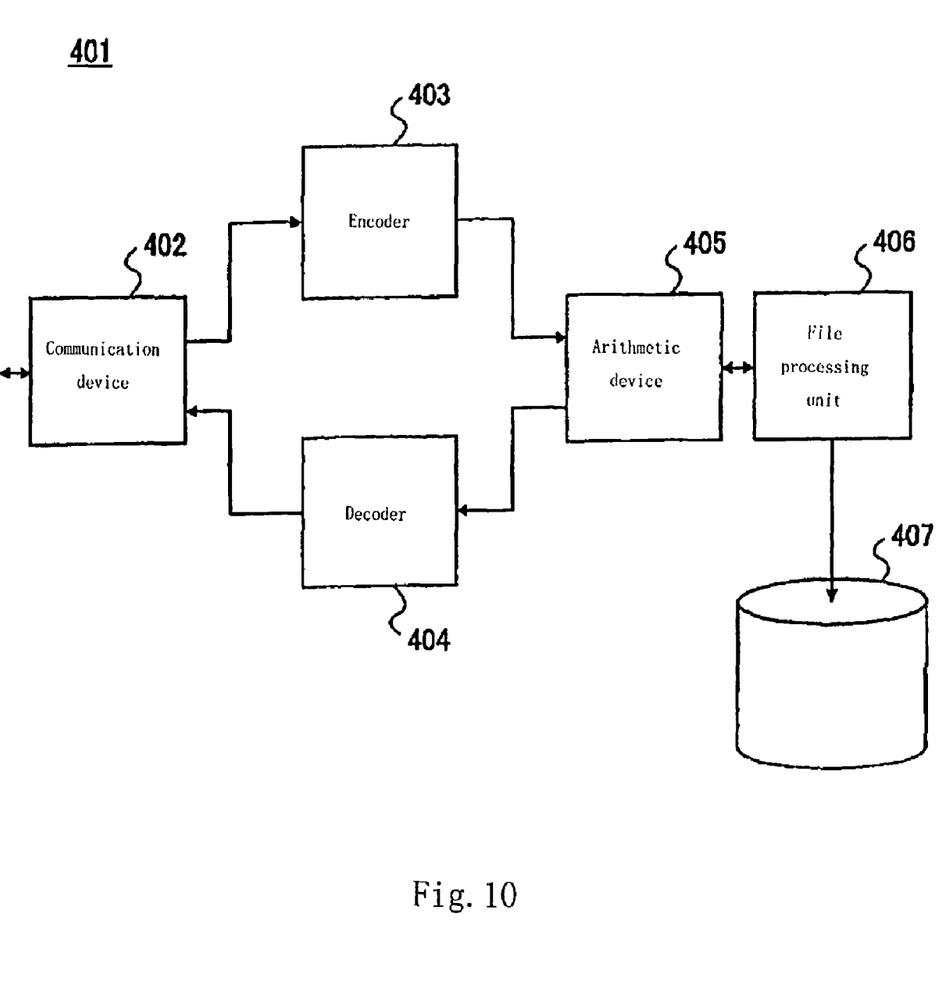
FIG. 10 is the block diagram of implementation example 4 of this invention.

FIG. 10 is the block diagram of implementation example 4 of this invention.

FIG. 10 demonstrates servo structure of this implementation example. Servo 401 of this implementation example may be, for example, lending servo. Servo 401 consists of communication device 402, encoder 403, decoder 404, arithmetic device 405, file processing unit 406 and file device 407.

Communication device 402 communicates with user terminals through network. Encoder 403 encodes user terminal data into set form. Decoder 404 decodes the encoded data by encoder 403. Arithmetic device 405 which has the same structure as FIG. 2, FIG. 5, FIG. 6, FIG. 9 decrypts the data from file devices through file processing unit 406 when the data from encoder 403 is encrypted as above.

File processing unit 406 stores the data from encoder 403 into file device 407. File device 407 is composed of hard disk, storing the data of file processing unit 406.

At this time, the data of user terminal consist of data, cipher conversion table and ciphertext.

Figure 11:
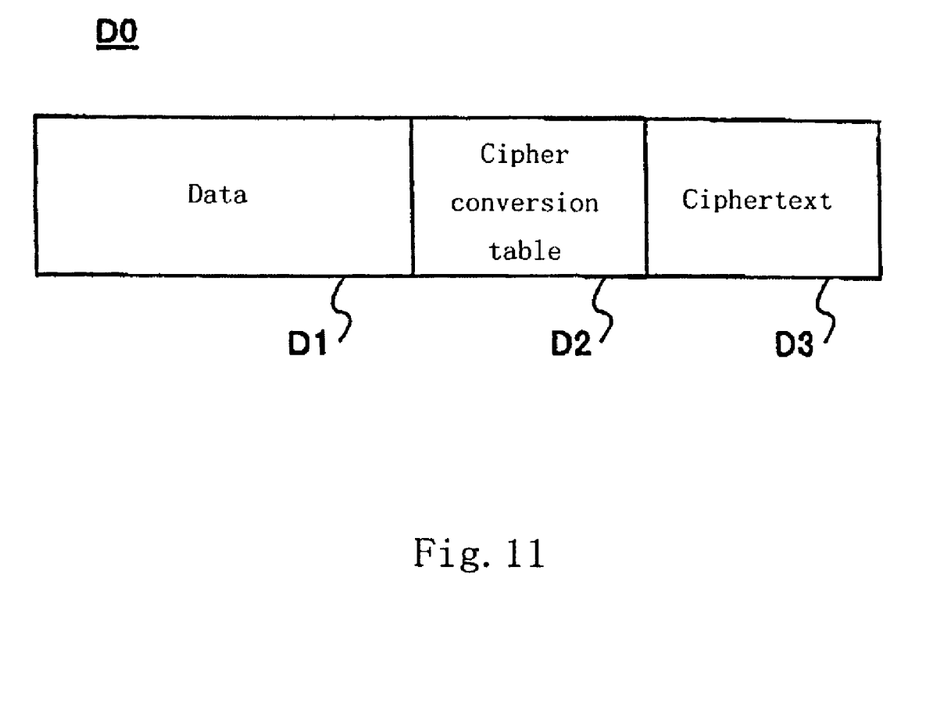
FIG. 11 is the data structure used in implementation example 4 of this invention.

FIG. 11 is the data structure used in implementation example 4 of this invention.

User terminal Data D0 consist of data D1, cipher conversion table D2 and ciphertext D3 as FIG. 11 shows.

Data D1 are encrypted by arithmetic device 405 with cipher conversion table D2 and ciphertext D3. Data encrypted by arithmetic device 405 are stored in file device 407 through file processing unit 406. At this time, cipher conversion table D2 may control random numbers of arithmetic device 405 to execute encryption. In addition, random numbers are stored in arithmetic device 405.

Data stored in file device 407 are read out by file processing unit 406. File processing unit 406 feeds data to decryption arithmetic device 405. Arithmetic device 405 decrypts encrypted data to original data to transmit to encoder 404. Encoder 404 decodes encoded data to original data to transmit to user terminal through communication device 402.

According to this implementation example, because user terminal data are encrypted and stored in file device 407, original data can not be recovered even if stored data in file device 407 are referred to. Therefore, data privacy can be ensured.

In addition, it is explained that encryption is executed at servo side in this implementation example, yet encryption can also be executed at user terminal and encrypted data are stored in file device of servo.

Figure 12:
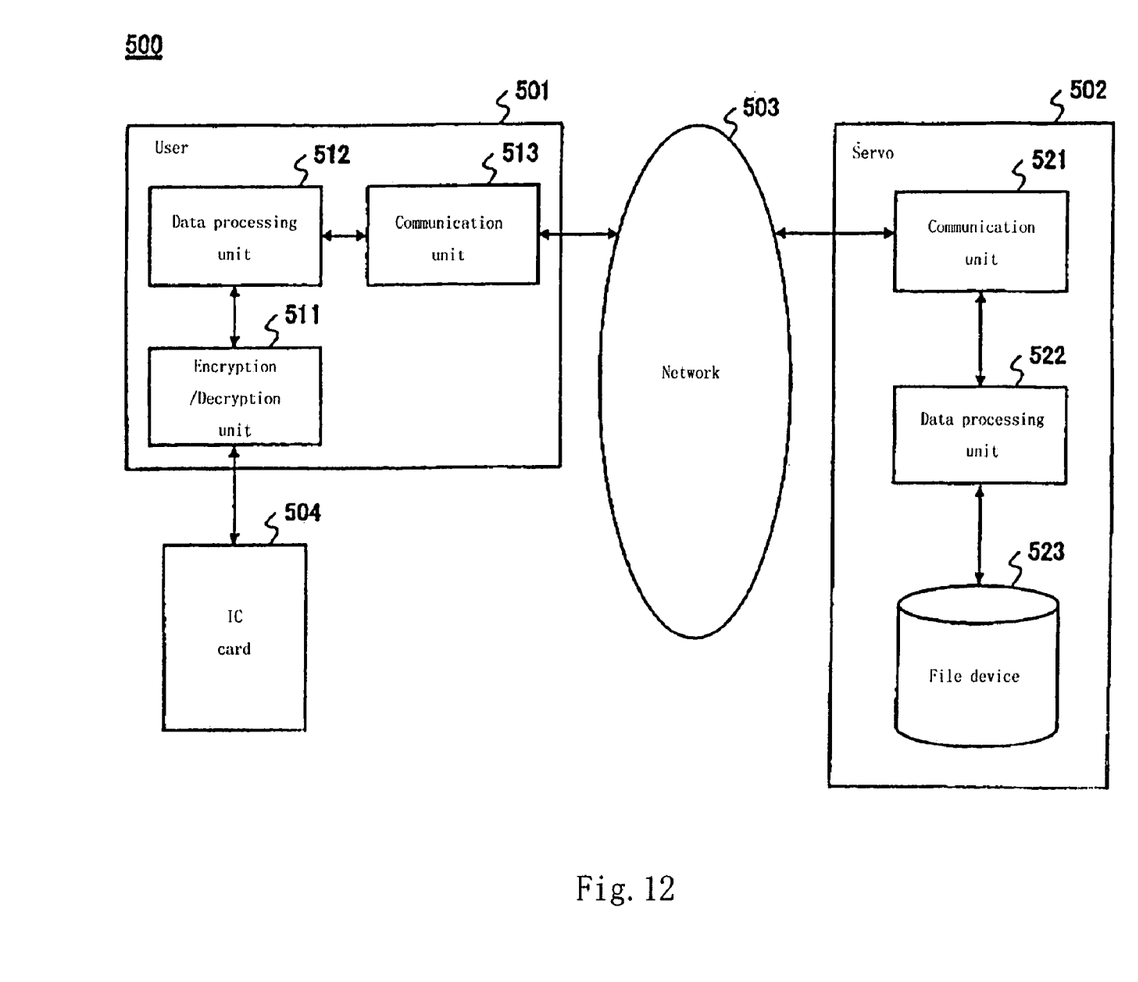
FIG. 12 is the block diagram of implementation example 5 of this invention.

FIG. 12 is the block diagram of implementation example 5 of this invention.

System 500 of this implementation example consists of user terminal 501 and servo 502 which connect each other through network 503.

IC card 504 is attached to user terminal 501. User terminal 501 executes encryption according to data in IC card 504, and transmits and stores encrypted data in servo 502.

User terminal 501 consists of encryption/decryption unit 511, data processing unit 512 and communication unit 513. Encryption/decryption unit 511 is fed with data of data processing unit 512 and IC card 504. Encryption/decryption unit 511 decrypts data of data processing unit 512 with data in IC card 504 as encrypts them with data in IC card 504.

Data processing unit 512 executes data processing at user terminal 501. Encrypted data by encryption/decryption unit 511 are fed to communication unit 513 through data processing unit 512. Communication unit 513 communicates with servo 502.

Servo 502 consists of communication unit 521, data processing unit 522 and file device 523. Communication unit 521 communicates with user terminal 501.

Data processing unit executes data processing in servo 502. File device 523 stores the data of user terminal 501.

At this time, make encryption/decryption unit 511 has the same structure as arithmetic devices in FIG. 2, FIG. 5, FIG. 6 and FIG. 9 to execute encryption/decryption. Furthermore, make IC card 504 and encryption/decryption unit 511 have the same structure as arithmetic devices in FIG. 2, FIG. 5, FIG. 6 and FIG. 9, thus communication between IC card 504 and encryption/decryption unit 511 has privacy.

According to this implementation example, encryption/decryption can be executed at user terminal 501, and data transmitted to servo 502 can be encrypted by file device 523 and be directly stored. Therefore, encrypted data can not be interpreted even if the encrypted data are referred to in network 503 and servo 502. In addition, data are encrypted by different algorithm at a time in encryption/decryption unit 511 which has the same structure as arithmetic devices in FIG. 2, FIG. 5, FIG. 6 and FIG. 9, so decryption is very difficult.

In addition, arithmetic devices in FIG. 2, FIG. 5, FIG. 6 and FIG. 9 adopt RAM; they can also adopt combination of RAM and ROM.

For example, input ciphertext and fingerprint, search ROM according to ciphertext or fingerprint, and then make RAM output data with ROM output as address. At this time, RAM writes data in the same way arithmetic devices in FIG. 2, FIG. 5, FIG. 6 and FIG. 9 write.

Figure 13:
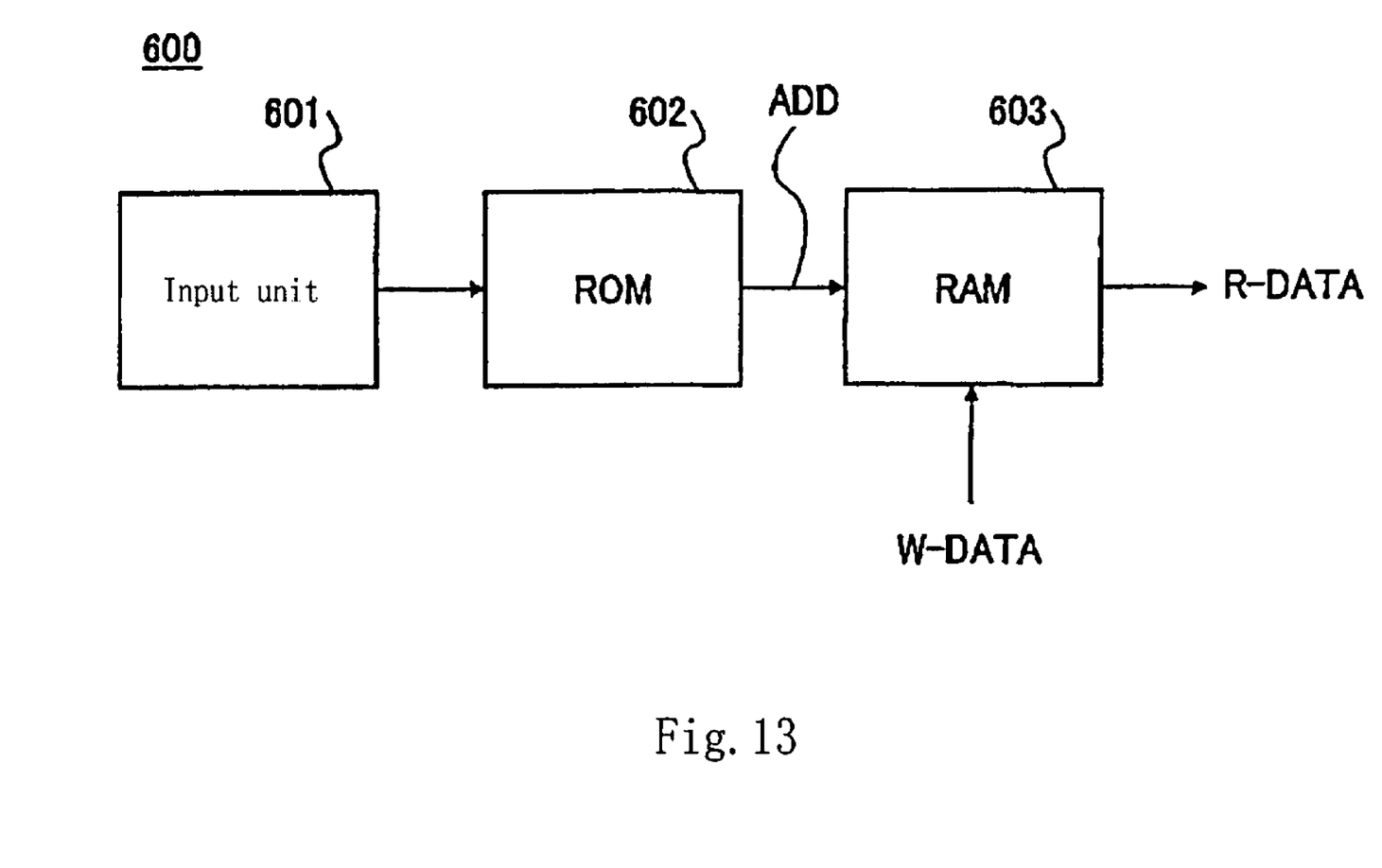
FIG. 13 is the block diagram of modified arithmetic device of an implementation example of this invention.

FIG. 13 is the block diagram of modified arithmetic device of an implementation example of this invention.

Arithmetic device 600 of this modified example consists of input unit 601, ROM602 and RAM603. Input unit 601 is composed of keyboard or fingerprint input unit, etc. In addition, input unit 601 is not confined to keyboard, fingerprint input unit, etc; it may be any device which can input data.

Input data by input unit 601 are fed to ROM602 as address. ROM602 outputs data corresponding to data address of input unit 601. Output data of ROM602 are fed to RAM603 as address.

RAM603 outputs data corresponding to dada address of ROM602. At this time, RAM writes data in the same way arithmetic devices in FIG. 2, FIG. 5, FIG. 6 and FIG. 9 write.

To apply arithmetic device of this modified example to IC card 2 and IC card 504 can improve data privacy.

As shown above, this invention not only can encrypt data, but can encrypt the encryption algorithm in advance; therefore, this invention has many advantages, for example, it can improve data security.

This invention is not confined to the above examples; a variety of modified examples and application examples within this invention scope can adapt to this invention.

The invention claimed is:

1. Computer readable storage media having computer executable instructions for implementing a method of data transfer by which data are transmitted from a data transmission device to a data reception device, comprising:
    transmitting an encryption algorithm to the data transmission device from the data reception device;
    using the encryption algorithm to encrypt the data transmitted to the data reception device;
    encrypting the encryption algorithm by the data reception device before being transmitted to the data transmission device, the encrypted encryption algorithm being decrypted at the data transmission device;
    the data reception device transmitting to the data transmission device a decryption algorithm, the decryption algorithm being used to decrypt the encryption algorithm, the decryption algorithm being encrypted by the data reception device before being transmitted to the data transmission device; and
    the data reception device transmitting to the data transmission device a plurality of decryption algorithms, each decryption algorithm except the last being encrypted by the data reception device before being transmitted to the data transmission device, the last decryption algorithm of the plurality of description algorithms not being encrypted before being transmitted to the data transmission device, each decryption algorithm being used to decrypt the encrypted decrypted algorithm transmitted immediately prior to the transmission of said each decryption algorithm.

2. The computer readable storage media of claim 1, the method of data transfer wherein each algorithm is different.

3. The computer readable storage media of claim 1, the method of data transfer wherein the data is divided into a plurality of bit-strings and wherein each of the plurality of bit-strings is encrypted with a different encryption algorithm.

* * * * *